April 16, 1968 W. T. JOSEPH 3,378,775

METHOD AND APPARATUS FOR CONTROLLING A TELEVISION RECEIVER

Filed Aug. 19, 1964

INVENTOR.
WILLIAM T. JOSEPH

BY

Lockwood, Woodard, Smith & Weikart
Attorneys 3,378,775
Patented Apr. 16, 1968

3,378,775

METHOD AND APPARATUS FOR CONTROLLING A TELEVISION RECEIVER

William T. Joseph, 702 Lexington Ave., Indianapolis, Ind. 46203

Filed Aug. 19, 1964, Ser. No. 390,571
6 Claims. (Cl. 325—395)

ABSTRACT OF THE DISCLOSURE

A control circuit for a television receiver wherein the power supply line for the receiver has a pair of contacts in it which are controlled by a power switching device. A signal sensing device senses the information including blanking pulses on the kinescope. The power switching device opens the contacts, terminating the power supply to the receiver when the signal sensing device senses that blanking pulses are no longer present on the kinescope.

The present invention relates to method and apparatus for controlling a television receiver.

Many persons turn on a television set and do not remain present at all times to watch the program on the set. For example in the lounge of a private club or a Y.M.C.A. or a similar location, a television set may be used continuously with no one assuming the responsibility for turning off the set at the end of the day's programming. If a television set is not turned off at the end of the programming period, power is wasted and the components of the television set wear out more quickly. Consequently, an important object of the present invention is to provide a control apparatus operable to turn off a television set at the end of the day's broadcasting.

Another object of the present invention is to provide a control apparatus for automatically turning off a television set without requiring any positive act on the part of the television receiver owner or user or the television station operator.

A further object of the present invention is to provide an improved method of controlling a television receiver.

Related objects and advantages will become apparent as the description proceeds.

One embodiment of the invention might include in combination with a receiver, a set of contacts in the power circuit to the receiver, means for opening said contacts, said means being responsive to the absence of a signal of given frequency in the receiver.

The full nature of the invention will be understood from the accompanying drawings and the following description and claims:

Figure 1:
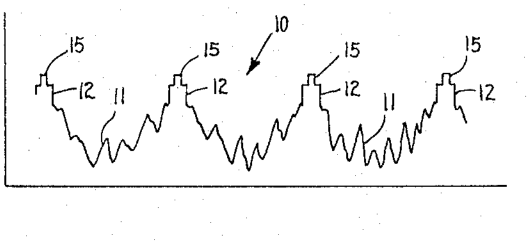
FIG. 1 is a graph showing a representative signal appearing on the kinescope socket of the TV receiver.

Referring more particularly to the drawings, there is illustrated in FIG. 1 the signal 10 which is present during the reception of a broadcast but is not present upon termination of the broadcast. This signal is plotted with amplitude on the vertical scale and time on the horizontal scale. The signal consists of a plurality of portions 11 of video information with each portion 11 being used for a single line across the face of the TV tube to produce the picture on the tube. As the electron beam moves across the TV tube, it is brighter or darker depending upon the voltage variation of the portion 11. Between each of the portions 11 is a blanking pulse 12 and a synch pulse 15. The blanking pulse operates to turn off the electron beam during the time that it is being returned to the starting side of the screen while the synch pulse maintains the television receiver synchronized with the transmitter.

Figure 2:
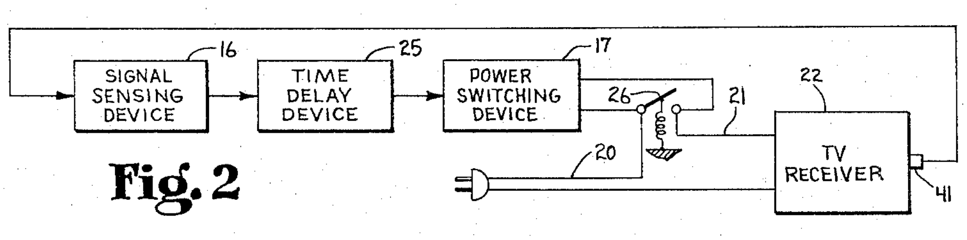
FIG. 2 is a block diagram of the circuit of the present invention.

The present invention uses the absence of the blanking and synch pulses to turn off the television receiver. The blanking and synch pulses are repeated at a frequency of approximately 15,750 c.p.s. Referring to FIG. 2, a signal sensing device 16 is provided which senses the frequency of the blanking and synch pulses and controls the power switching device 17 to maintain the circuit closed between lines 20 and 21 in the power circuit of the TV receiver 22.

Coupled between the signal sensing device 16 and the power switching device 17 is a time delay circuit 25 which prevents a momentary absence of the 15,750 c.p.s. frequency from shutting off power to the receiver 22. For example, this time delay circuit 25 might be set for a full minute whereby an absence of the frequency for at least a full minute is required to turn off the receiver. Such an arrangement is useful because of the necessity for the receiver to warm up after turning on of the switch thereof. Any suitable means might be used for initially turning on the receiver of FIG. 2, for example, a spring biased push button 26 might be actuated to close the circuit between the lines 20 and 21 instantaneously whereby the components 16, 25 and 17 then go into operation maintaining the circuit closed between the lines 20 and 21 for at least a full minute and longer if a broadcast is being received by the receiver 22.

Figure 3:
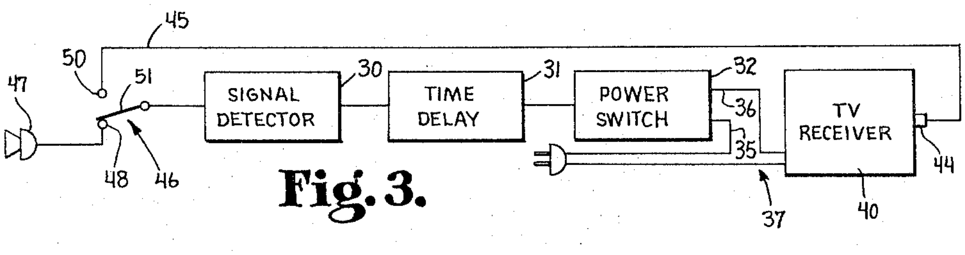
FIG. 3 is a block diagram of an alternative embodiment of the present invention.

Referring to FIG. 3, an alternative embodiment of the present invention includes a signal detector 30, time delay device 31 and a power switch 32 identical to the arrangement of FIG. 2 and arranged to control the lines 35 and 36 to the power circuit 37 of the receiver 40 in the same manner as described above in connection with FIG. 2. Unlike the circuit of FIG. 2 wherein the signal sensing device 16 is coupled only to the kinescope socket 41 of the receiver 22 through the line 42, the circuit of FIG. 3 may be selectively coupled through the line 45 to the kinescope socket 44 or, by means of switch 46, to the output lead 48 of a microphone 47. When the microphone 47 is provided with sound at a frequency of approximately 15,750 c.p.s., the circuit including components 30, 31 and 32 is operated to close the connection between the lines 35 and 36 providing power to the receiver. The switch 46 can be operated to close contacts 50 and 51 whereby the device of FIG. 3 operates identically to the device of FIG. 2.

It should be understood that the circuitry used in the devices of FIGS. 2 and 3 may include various components. For example, the signal sensing circuit can be an amplitude threshold circuit, a resonant reed circuit, a tuned electronic circuit, etc. The time delay circuit can be a thermal switch, a motor driven timer, a resistor capacitor charge or discharge circuit, etc. The power switching device may be mechanical, electro-mechanical, electronic, etc. The preferred form of the circuit of FIG. 3 is illustrated schematically in FIG. 4.

Figure 4:
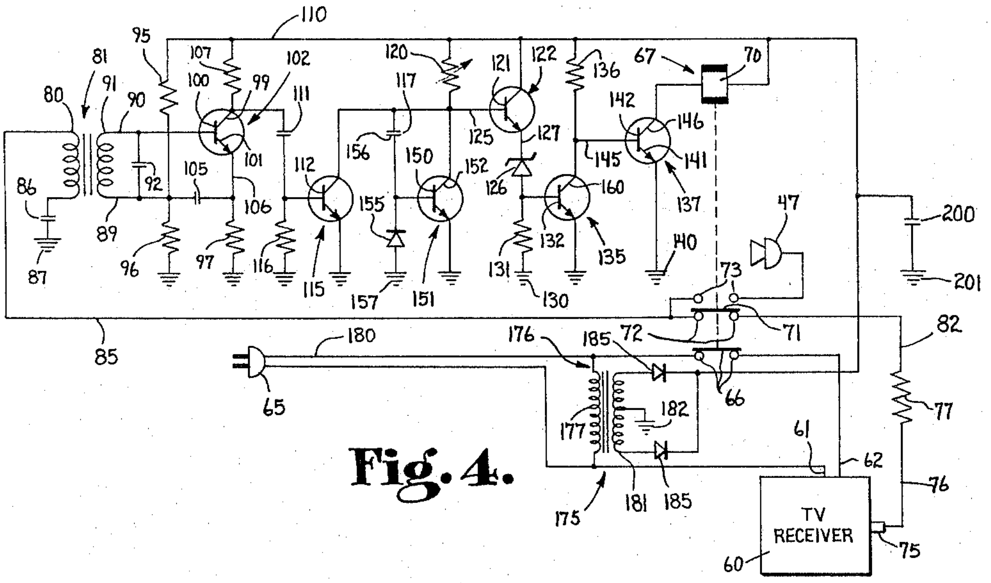
FIG. 4 is an electrical schematic diagram showing further details of the circuit of FIG. 3.

Referring to FIG. 4, there is illustrated a TV receiver 60 having power input leads 61 and 62. The lead 61 is connected directly to the wall plug 65 while the lead 62 is connected to the wall plug 65 through the contacts 66 of a relay 67. The relay 67 includes a solenoid 70 and further contacts 71, 72 and 73. When the solenoid 70 is not energized, the contacts 66 are open and the contact 71 engages and closes the contacts 73. When the solenoid 70 is energized, the contacts 66 are closed and the contact 71 engages and closes contacts 72.

The entire video signal is coupled from the kinescope socket 75 of the receiver by way of the line 76 to the primary 80 of a tuned transformer 81 through resistor 77, line 82, the contacts 71 and 72, the line 85, the primary 80, the capacitor 86 and ground 87. The capacitor 86 may, in one preferred embodiment of the invention, have a rating of .05 mfd. while the resistor 77 may have a rating of 10 kilo-ohms in said preferred embodiment. In the remainder of the present description the various specific values given for components refer to said one preferred embodiment.

The resistor 77 prevents excessive loading of the video signal and thus prevents any dimming of the picture from this cause. The capacitor 86 blocks any DC current flow to ground. Coupled across the output leads 90 and 89 of the secondary 91 of the transformer 81 is a .0039 mfd. capacitor 92. The capacitance of component 92 is chosen according to the inductance of the transformer to produce resonation of the circuit including the secondary 91 and the capacitor 92 and associated circuitry at 15,750 c.p.s. The resistors 95, 96 and 97 are 27 kilo-ohms, 4.7 kilo-ohms and 1 kilo-ohm, respectively, and establish proper bias on the collector 99, base 100 and emitter 101 of the transistor 102. A .01 capacitor 105 is coupled between the emitter lead 106 of the transistor 102 and the lead 89 from the secondary 91 of the transformer and permits the tuned circuit voltages from the secondary 91 and capacitor 92 to be applied across the base and the emitter of the transistor. The load of the transistor 102 is the resistor 107 coupled between the collector 99 of the transistor 102 and the DC bias current line 110 of the circuit.

Since the synch and blanking pulses recur at 15,750 c.p.s., they cause an oscillating current to build up in the tuned circuit comprising components 91 and 92. This current develops a voltage between the base 100 and the emitter 101 of the transistor 102 which is amplified by the transistor and is coupled by a .01 mfd. capacitor 111 to the base 112 of a transistor 115. The transistor 115 operates as an electronic switch which is normally cut off because of the biasing resistor 116 which has a value of 47 kilo-ohms. The transistor 115 does, however, conduct on the positive peaks of the 15,750 c.p.s. signal which has become essentially a sine wave shaped signal at the base 112.

Each time the transistor 115 conducts, it discharges the capacitor 117 which has a value of 8 mfd. A certain amount of recharging of the capacitor 117 occurs from the line 110 between each pulse through the variable resistor 120 which may be variable between zero and 500 kilo-ohms. However, the frequent pulses from the transistor 115 repeatedly discharge the capacitor 117, and, in effect, maintain the capacitor 117 in a substantially discharged condition.

The capacitor 117 is coupled to the base 121 of transistor 122 through a line 125. As long as the capacitor 117 is discharged, the base 121 of the transistor 122 remains at a low voltage preventing the Zener diode 126 from conducting. The Zener diode 126 is coupled to the emitter 127 of the transistor 122 and is connected to ground at 130 through 47 kilo-ohm resistor 131. The base 132 of transistor 135 is coupled in the circuit between the components 126 and 131.

As long as the Zener diode 126 is not conducting the base 132 is maintained at a low voltage level and transistor 135 does not conduct. As a result the only current flowing through the 3.9 kilo-ohm resistor 136 is the base current for the transistor 137, said base current flowing from ground 140 through emitter 141, base 142, line 145 and resistor 136. This relatively high base current produces a collector current from the collector 146 through the solenoid 70 which maintains the solenoid energized and maintains the contacts 71 and 72 closed and the contacts 66 closed. The fact that the contacts 66 are maintained closed maintains the power supply to the receiver from the wall plug 65 through the lines 61 and 62.

Assuming now that the broadcasting is terminated, the signal illustrated in FIG. 1 will no longer be present at the kinescope socket. As a result, the tuned circuit, including the secondary 91 of the transformer and the capacitor 92 are no longer receiving the 15,750 c.p.s. blanking signal frequency from the kinescope socket through the line 85 to the primary 80 of the transformer 81. Consequently, no pulses will be applied to the base 112 of the transistor 115 and the transistor will remain cut off. The capacitor 117 will begin to charge through the variable resistor 120 and the base 150 of the transistor 151.

The base current through the transistor 151 produces a collector current through the collector 152 of the transistor 151, which collector current reduces the collector voltage at 152. It will be noted that the collector voltage 152 is also the charging voltage for the capacitor 117. The reduction of the collector voltage in the above manner slows the natural charging rate of the capacitor 117 by a factor equal to the gain of the transistor 151 as it is coupled in the circuit. It should be mentioned that the rectifier 155 which makes possible the discharging of the capacitor 117 is coupled between the plate 156 of the capacitor and ground 157.

As the collector voltage at 152 slowly rises, the voltage at the base 121 and emitter 127 of the transistor 122 also rises until a voltage is reached at the emitter 127 sufficient to cause the Zener diode 126 to conduct. Conduction of the diode 126 turns on the transistor 135 causing the voltage at the collector 160 of the transistor 135 to drop to approximately .2 volt which is below the .7 volt required at the base of the transistor 137 to cause it to conduct. The transistor 137 is therefore turned off and the solenoid 70 of the relay 67 is deenergized, causing the contact 71 of the relay to move away from the contact 72 and to engage the contacts 73. Deenergization of the solenoid 70 also opens contacts 66, thus shutting off power to the TV receiver 60.

The resistor 120 is made variable in order to permit a variation in the time required to charge the capacitor 117 and thus to permit a variation in the time required for the absence of the blanking pulse signal to cause a breaking of the contacts 66. Assuming now that a signal of proper frequency, i.e., 15,750 c.p.s. is provided to the microphone 47, the circuit will be operated to energize the solenoid 70 to close the contacts 66 again providing power to the receiver 60.

DC bias is continuously provided to the line 110 from the full wave rectifier circuit 175 which includes a center tap transformer 175 having its primary 177 coupled across the lines 61 and 180. The center tap of the secondary 181 is grounded at 182. A pair of rectifiers 185 are connected to the opposite ends of the secondary 181 with their positive and negative poles in suitable direction to always maintain a positive DC voltage on the line 110. It should be mentioned that all of the transistors 102, 115, 151, 135 and 137 are transistors, Model No. 2N2711.

In summary, the first transistor 102 acts as an amplification stage and the second transistor 115 acts as a switch while the third transistor 151 is a portion of the RC timing circuit. The fourth transistor 122 couples the RC charge voltage to the fifth transistor 135 which acts as a switch for the sixth transistor 137, which also acts as a switch, but for the relay 67. Any relay might be used for the relay 67 up to 50 to 75 mils rated current. A 500 mfd. capacitor 200 is coupled between ground 201 and the line 110 and acts as a filter for the DC power supply full wave rectifier circuit 175. The center tap transformer 176 is selected so as to provide a 10 volt DC bias between the line 110 and ground.

It should be pointed out that the circuit of the present invention is easy to connect to an existing television set since it need only be coupled in the power supply line and to the picture tube socket. Of course, the present device would also serve in excellent fashion if incorporated in the original design and construction of the TV set, in which event the video information might be tapped off from other points in the receiver.

It will be evident from the above description that the present invention provides a control apparatus operable to automatically turn off a TV set at the end of the day's broadcasting. It will also be evident that the present invention provides an improved method for controlling a TV receiver.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. In combination with a receiver continuously receiving information carrying signals at radio frequency including a periodic signal component of a predetermined character, a set of contacts in the power circuit to the receiver for terminating the power supply to the receiver, control means for opening said contacts, said control means being responsive to the presence of said signal component to maintain said contacts closed and responsive to the absence of said signal component for a predetermined time to open said contacts.

2. A control circuit for a television receiver comprising a power supply line for the receiver, a signal sensing device arranged to sense the video information including blanking pulses of said receiver, a power switching device responsive to said signal sensing device and arranged to control power through said power supply line and to break the power supply line when said signal sensing device senses that the blanking pulses are no longer present.

3. A control circuit for a television receiver comprising a power supply line for the receiver, a signal sensing device adapted to sense the video information including blanking pulses of said receiver, a power switching device arranged to break the power supply line when said sensing device senses that blanking pulses are no longer present, and a time delay circuit coupling the signal sensing device to the power switching device.

4. A method of controlling a television receiver receiving video information including blanking pulses, said method comprising continuously sensing the blanking pulses in the video information of the receiver, and opening the power circuit to the receiver in response to the termination of said blanking pulses.

5. In combination with a television receiver, a set of contacts in the power circuit to the receiver, a relay controlling said contacts to maintain them closed when said relay is energized, an RC circuit coupled to said relay and maintaining said relay energized when said capacitor is discharged, a tuned LC circuit coupled to the kinescope of the television receiver, said LC circuit being coupled to said RC circuit in such a manner as to maintain the capacitor thereof discharged when a signal of a given frequency appears at said kinescope.

6. The combination of claim 5 additionally comprising a microphone, said relay including contacts selectively operable to disconnect said LC circuit from said kinescope socket and connect said microphone to said LC circuit upon deenergization of said relay and to disconnect said microphone and connect said kinescope socket to said LC circuit upon energization of said relay.

References Cited

UNITED STATES PATENTS 2,817,025 12/1957 Adler ---------- 325—391 XR

OTHER REFERENCES

Phelps, J. H.: CB Receiver Opens Garage Door, in Radio-Electronics, pp. 26–27, January 1963.

KATHLEEN H. CLAFFY, *Primary Examiner.*

R. LINN, *Assistant Examiner.*